Nov. 17, 1970  L. I. GOLDFISCHER  3,541,246
CENTROID TRACKER SYSTEM
Filed April 13, 1967  6 Sheets-Sheet 1

Nov. 17, 1970  L. I. GOLDFISCHER  3,541,246
CENTROID TRACKER SYSTEM
Filed April 13, 1967  6 Sheets-Sheet 2

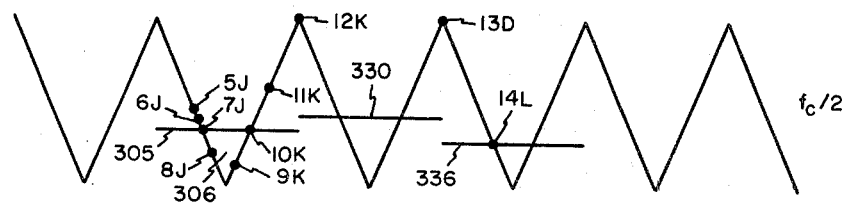
FIG. 8A
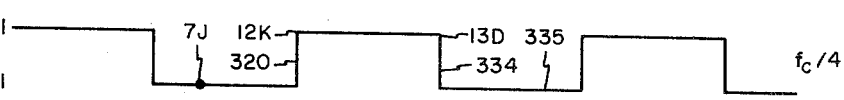
FIG. 8B
FIG. 8C
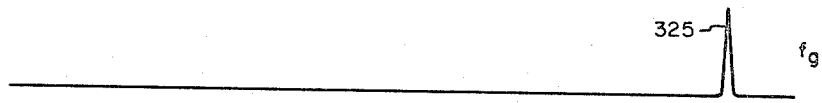
FIG. 8D
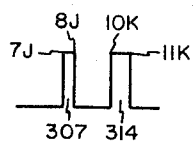
FIG. 8E
FIG. 8F
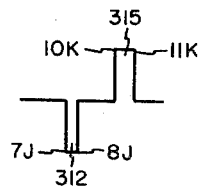
FIG. 8G
FIG. 8H
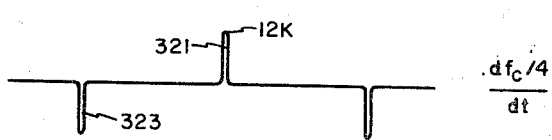
FIG. 8J
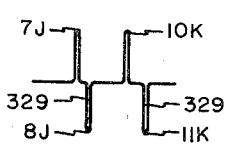

United States Patent Office 3,541,246
Patented Nov. 17, 1970

1

3,541,246
CENTROID TRACKER SYSTEM
Lester I. Goldfischer, New Rochelle, N.Y., assignor to Singer-General Precision, Inc., a corporation of Delaware
Filed Apr. 13, 1967, Ser. No. 630,608
Int. Cl. H04n 3/00
U.S. Cl. 178—6.8
11 Claims

ABSTRACT OF THE DISCLOSURE

A single target centroid tracking system is disclosed which performs its tracking function on the basis of continuous computation of the centroid of area of the target of interest. As currently preferred, the tracking system comprises transmitter means, including camera tube means which provide video signals indicative of the target configuration, and are adjustably positionable, in response to target centroid displacement or error signals provided thereto, to maintain the target substantially centered within the field of view thereof; and receiver means including a display tube upon which is provided a target display in response to the said video signals. The target display is provided on the raster of the display tube through the use of a somewhat modified rectangular scanning pattern, the nature of which is particularly compatible with the target display centroid area of computation process. Scan generator means and target display centroid of area computer means are also provided and the former function to provide, in proper time relationships, the waveforms required to achieve the desired scanning pattern and the operating waveforms for the centroid of area computer means, while the latter function, through the analysis of the said video signals, and various of the said operating waveforms, to determine the displacement, if any, of the centroid of area of the target display from the center of the display tube raster and in turn provide error signals representative thereof. Means are provided to transmit these error signals to the adjustably positionable camera tube means and change the position of the latter in accordance therewith to substantially center the target in the field of view thereof and drive the centroid of area of the target display into substantial coincidence with the center of the display tube raster.

BRIEF SUMMARY OF THE INVENTION

This invention relates to new and improved single target centroid tracker systems. More particularly, the invention relates to a new tracking system which functions through the computation and tracking of the centroid of area of a display provided of a single target of interest.

Although the prior art includes numerous tracking systems in the nature, for example, of correlator and analogous systems which demonstrate excellent target acquisition and initial target tracking capabilities, the terminal or close range tracking capabilities of such prior art systems are somewhat limited whereby the same may prove unsatisfactory for target tracking operations requiring a very high degree of accuracy in the terminal portion of the target tracking operation. In addition, since most of the prior art target tracking devices of the nature referred to hereinabove function as target edge, rather than target centroid, trackers, the passage of the interfering object between the target and the tracking device can result in complete failure of the target tracking system operation through the acquisition and tracking by the former of the interfering object rather than

2 the target of interest. Also of a somewhat undesirable nature is the fact that the prior art target tracking systems in the nature of correlators function, in well-known manner, through the comparison of a pictorial representation of the target of interest with the provided target image to thus require an extreme amount of detail in the latter and attendant hardware of considerable complexity and relatively high cost.

Briefly described, the present invention provides for the tracking of a single target of interest through the provision of a target display and the calculation of the centroid of area of the said display. Deviation, if any, of the centroid of area of the target display from the center of the means utilized to provide the said display, is utilized to provide error signal representative thereof, which error signals may in turn be utilized to maintain the target tracking system of the invention substantially locked on to the centroid of area of the target of interest.

It is, therefore, an object of this invention to provide a new and improved single target centroid tracking system which functions through the computation and tracking of the centroid of area of a display provided of a single target of interest.

Another object of the invention is the provision of a new and improved single target centroid tracking system which displays excellent accuracy during the terminal portion of a homing guidance target tracking operation and is thus particularly, though by no means exclusively, adapted for operation in applications wherein collision between a carrier of the sensing portion, at least, of the system and the target, or the close proximity thereof, is required.

The above and other objects and advantages of the invention are believed made clear by the following detailed description thereof taken in conjunction with the accompanying drawings wherein:

FIG. 1 illustrates, in block diagram form, a single target centroid tracking system constructed in accordance with a currently preferred embodiment of the invention;

FIGS. 2 and 3 diagrammatically illustrate the scanning patterns utilized in the scanning of even and odd frames, respectively, for the provision of the target display;

FIGS. 8A through 8J, inclusive, illustrate the plurality of waveforms utilized in and/or provided by the operation of the video processor means of FIG. 6.

Figure 1:
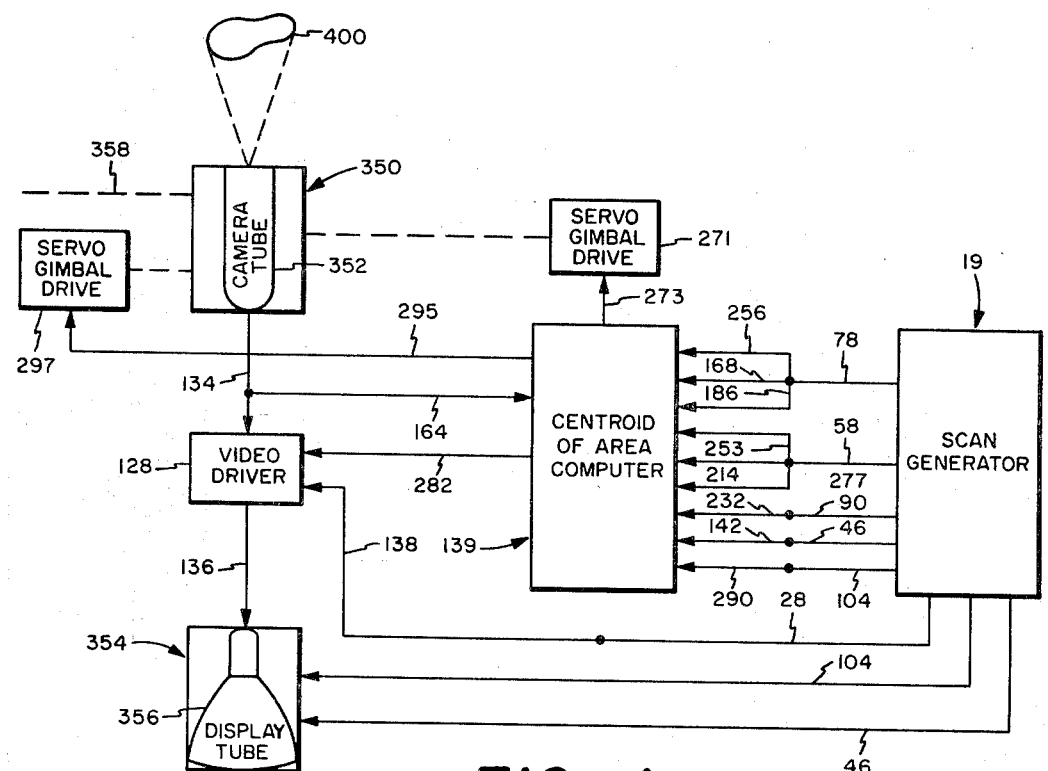

For purposes of preliminary general description, a currently preferred form of the single target centroid tracking system of the invention is diagrammatically illustrated in FIG. 1 and, as seen therein, comprises video signal transmitting means 350, including camera tube means 352. The camera tube means 352 are adjustably positionable through the use of train and elevation drive, servo gimbal means as indicated at 271 and 297, respectively, which function, when properly actuated in the manner described in detail hereinbelow, to maintain the camera tube substantially locked on the target of interest as indicated at 400 so that the latter is substantially centered within the field of view of the former.

Video driver means 128 are arranged to receive the video signals from the video signal transmitting means 350, as indicated by signal transmitting path 134 extending therebetween, and target display forming means 354, including display tube means 356, are connected by path 136 to the video driver means 128 whereby a display of the target image picked up by the camera tube 352 may be provided on display tube 356.

Scan generator means are indicated generally at 19 and function to provide the requisite line and vertical drive waveforms to the target display forming means 354 along paths 46 and 104 extending therebetween.

Centroid of area computer means are indicated generally at 139 and the scan generator means 19 are connected thereto as indicated by the plurality of paths extending therebetween to provide the said line and vertical drive waveforms, and a plurality of other computer operating waveforms which are functions thereof, to the centroid of area computer means 139. The video signal from the video signal transmitting means 350 is also provided to the centroid of area computer means 139 as indicated by path 164.

Signal transmission paths 273 and 295 are indicated as extending between the centroid of area computer means 139 and the respective train and elevation drive, servo gimbal means 271 and 297 to indicate the control of the latter, and accordingly of the orientation of the camera tube means 352 relative to the target 400, in accordance with error signals supplied from the centroid of area computer means to the said servo gimbal means. Center blanking pulse and target display edge enhancement signals are provided, by paths 138 and 282 for purposes described in detail hereinbelow, to the video driver means 128 from the respective scan generator means 19 and centroid of area computer means 139.

In operation, the centroid of area computer means 139 function, through analysis and comparison of the respective video signals and waveforms applied thereto from the video signal transmitting means 352 and scan generator means 19, respectively, to compute both the horizontal and vertical displacement, if any, of the centroid of area of the target display provided on the raster of the display tube means 356, from the center of the said raster, and to provide error signals representative of this displacement to the respective train and elevation drive, servo gimbal means to drive the camera tube means 352 to the requisite extent and achieve substantial coincidence between the said raster center and target display area centroid, respectively.

Prior to the commencement of operation of the single target centroid tracking system of the invention, the camera tube 352 must be aligned with the target 400 so as to provide a display of the latter on the display tube 356 in such manner that the center of the display tube raster lies within the boundary of the said target display. This may be accomplished manually by a system operator through the utilization of manually operable camera tube adjustment means as indicated by the dashed line 358. Alternatively, this initial camera tube-target alignment, or target acquisition, may be accomplished through the use of non-illustrated correlator means, and at the conclusion of which control of the camera tube means 352 may be readily switched from the said correlator means to the system of the invention.

Figure 2:
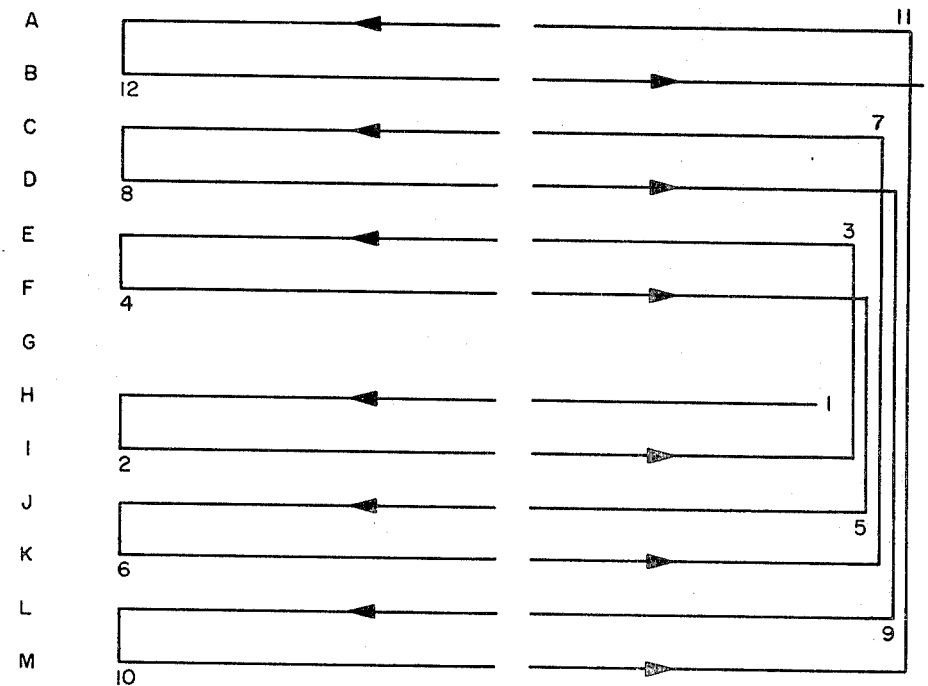
Figure 3:
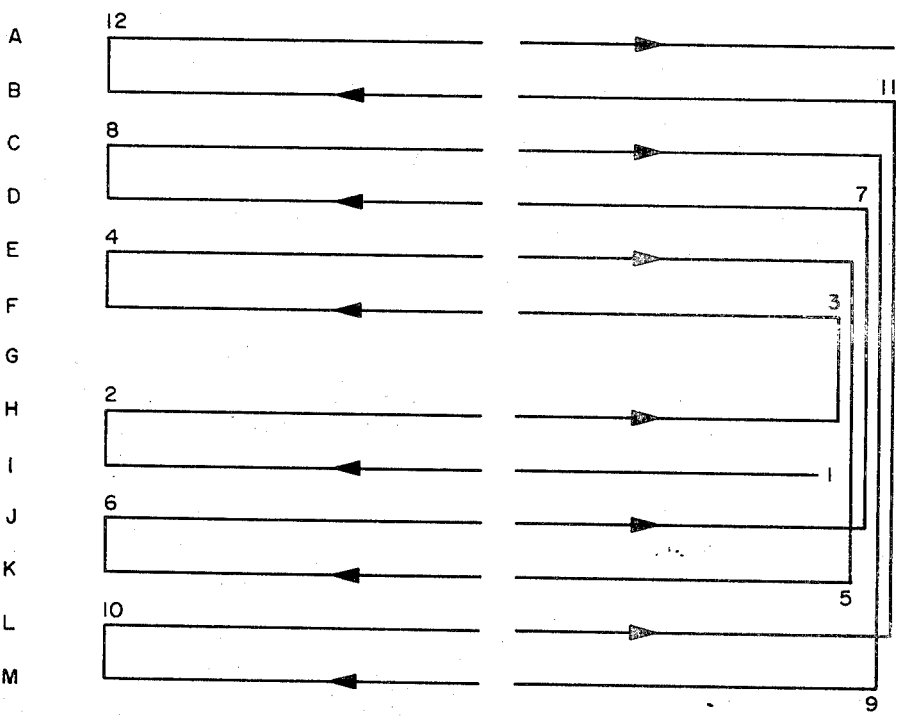

The scanning patterns used to provide the target image on the raster of the display tube 356 are indicated diagrammatically in FIGS. 2 and 3. Since the target centroid computation process is carried out in rectangular coordinates, in the manner described in detail hereinbelow, a somewhat modified rectangular scanning pattern is used. This provides the advantages that an essentially conventional display is presented on the television monitor raster with little or no accommodation being required of the operator and as compared, for example, with a system employing a generally radial scanning pattern, will probably require system equipment of lesser complexity and eliminate the problem of the creation of a bright spot in the central area of the raster as is common in radar systems which employ a generally radial scanning pattern.

FIG. 2 diagrammatically represents the scanning pattern utilized for the scanning of even frames, while FIG. 3 similarly represents the scanning pattern utilized for the scanning of odd frames. In each of the scanning patterns it should become apparent that the central line of the raster, namely, line G, is not used and that the centers of all of the other scan lines are blanked out, each of which is accomplished in a manner described hereinbelow. Thus, in effect, cross hairs are superimposed over the raster display and, since the target display is presented as what might be termed "white on black," the said cross hairs will be maintained at background level to be "black."

In general, FIGS. 2 and 3 are believed to make clear that alternate line pairs, namely, line pairs HI, EF, JK, CD, LM and AB, respectively, are scanned above and below the horizontal cross hair, with increasing displacement from the latter until the raster is completely filled in. Since one line in each pair is written from left to right while the other is written in the opposite direction, the use of a blanked retrace is avoided. The writing direction of each line is reversed on alternate frames for reasons described in detail hereinbelow in the description of the centroid of area computer means of FIG. 6.

More specifically, in the scanning of an even frame as illustrated in FIG. 2, the scanning beam commences the scanning pattern at the right end of the line H of line pair HI and scans the said line from right to left as indicated by the directional arrow in the drawings. That, in this instance, line H is the first line scanned is indicated by the numeral 1 appearing adjacent thereto. At the completion of this scanning of line H, the electron beam is deflected vertically downward to the left end of line I, and traversed thereacross from left to right to accomplish the scanning thereof, with the numeral 2 and the directional arrow on line I in FIG. 2 functioning to indicate that this is the second line scanned and that it is scanned from left to right. The scanning of line I is followed by the vertically upward deflection of the scanning beam to the right end of line E, whereupon the latter is scanned from right to left, the scanning beam deflected vertically downward to line F, and line F in turn scanned from left to right. This is followed by the vertically downward deflection of the scanning beam to the right end of line J, the scanning thereof from right to left, the vertically downward deflection of the scanning beam from line J to line K, and the scanning of line K from left to right. Lines C, D, L, M, A, and B, in that order, are then scanned in turn in the respective manners and scanning directions believed made clear by the preceding description and the directional arrows provided on the said lines, to thus complete the scanning of an even frame. In actual practice, the provision of the horizontal cross hair on the raster during the scanning of an even frame is accomplished by the simple expedient of not scanning the central line, namely, line G, of the raster whereby the said line will remain at background level to provide the horizontal cross hair. That is, of course, accomplished by suitable shaping of the vertical drive waveform as described in detail hereinbelow. The provision of the vertical cross hair during scanning is accomplished through the use of center blanking pulses which take the form, and are generated, in the manner described in detail hereinbelow and function to interrup the electron beam as the latter traverses the similarly dimensioned, vertically aligned central portions of the lines A–F and H–M to thus maintain the central portions at the black level and provide the vertical cross hair.

The scanning pattern utilized in the scanning of odd frames is quite similar to that used in the scanning of even frames and, as diagrammatically illustrated in FIG. 3, may be seen to again comprise the consecutive scanning, in opposite directions of the adjacent lines which form the line pairs. The scanning pattern of FIG. 3 commences at the right end of line I and it will thus be required that the scanning beam be deflected vertically downward from the right end of line B at the completion of the scanning of the even frame of FIG. 2, to the right hand end of line I for the commencement of the scanning of the odd frame of FIG. 2. Line I is then scanned from right to left and this is followed by the vertically upward deflection of the scanning beam from the left end of line I to the left end of line H, and the scanning of the latter from left to right as indicated by the directional arrow provided thereon. This completes the scanning of line pair IH, whereupon the scanning beam is deflected vertically upward to the right end of line F, traversed thereacross to the left end thereof, deflected vertically upward to the left end of line E, and traversed across the latter to the right end thereof to complete the scanning of line pair FE. Lines K, J, D, C, N, L, B, and A, respectively, are then scanned in that order in the manner and directions believed made clear by the directional arrows and line scanning sequence designation numerals as appear in the subject figure. At the completion of the scanning of the odd frame of FIG. 3, the electron beam will be located at the right end of line A to thus require the vertically downward deflection thereof to the right end of line H to enable the commencement of the scanning of the succeeding even frame in accordance with the scanning pattern of FIG. 2.

Summarized briefly, this alternate scanning of even and odd frames in the described, somewhat modified rectangular scanning pattern manner, may be understood to provide for the scanning, in opposite directions, of each line of each line pair during the scanning of an even and odd frame, respectively.

Figure 4:
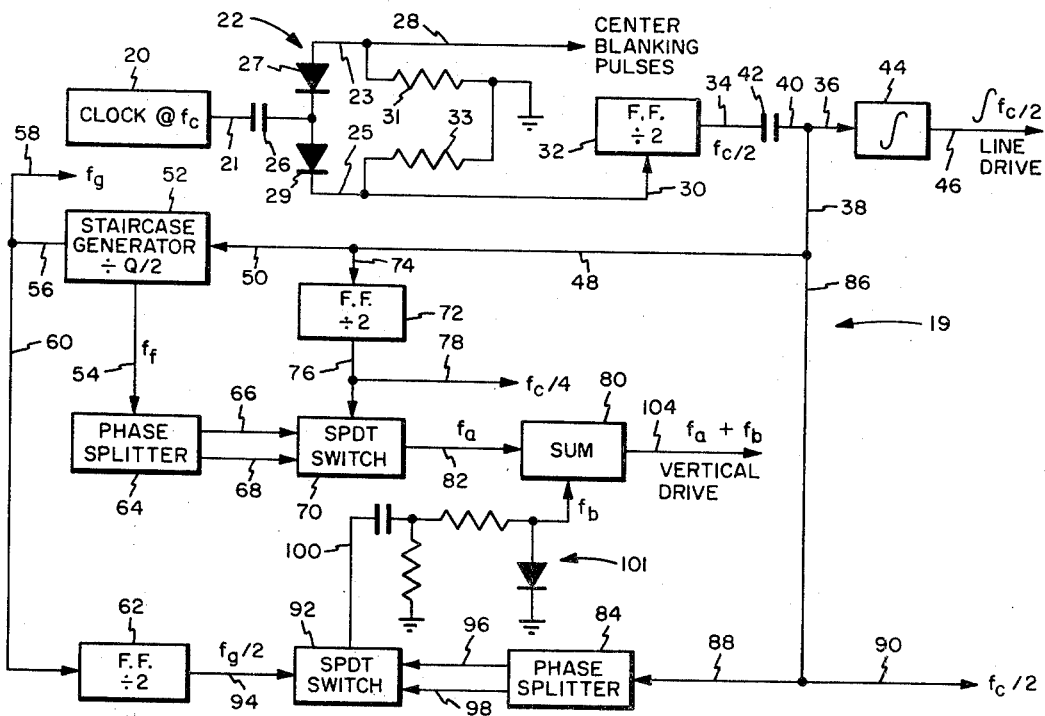
FIG. 4 illustrates, in block diagram form, a currently preferred form of the scan generator means of the single target centroid tracking system of FIG. 1.
Figure 5:
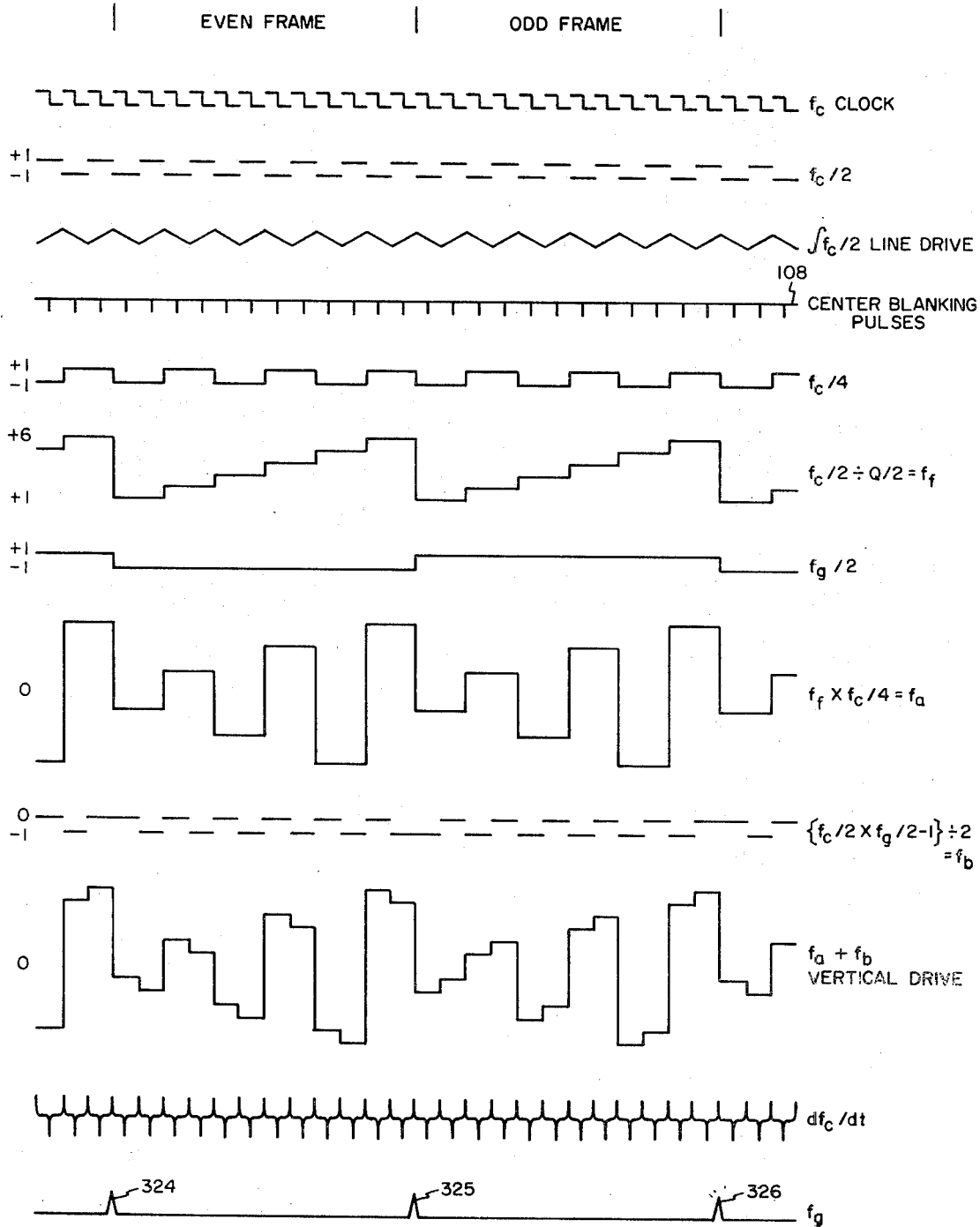
FIG. 5 illustrates the operating waveforms provided by the operation of the scan generator means of FIG. 4.

The plurality of waveforms which must be generated to provide the scanning patterns of FIGS. 2 and 3, and the time relationships of the said waveforms, are believed clearly illustrated in FIG. 5, while FIG. 4 illustrates, in block diagram form, the currently preferred forms of the various electronic components, and manners of interconnection thereof, which are required for the generation of the said waveforms. At this juncture it may be noted that, while for purposes of simplification of illustration and description, the scanning patterns of FIGS. 2 and 3, and the waveforms of FIG. 3, are those which would be appropriate to a 12-line target display, actual utilization of the single target centroid tracker of the invention would preferably comprise the generation of a target display of at least 200 lines. If this information is coupled with the knowledge that a frame rate of 100 per second would be desirable for satisfactory operation with drive servo gimbal means, an actual practice clock and line rate of 20 kc.p.s. may be readily arrived at.

Referring first in detail to FIG. 4, the scan generator means which provide the waveforms required for the generation of the scanning patterns of FIGS. 2 and 3 are indicated generally at 19 and, as currently preferred, comprise square wave generator or clock means 20 which preferably take the form of conventional, symmetrical multivibrator means. Differentiating circuit means are indicated generally at 22 and are connected to the clock means 20 by path 21. The former comprise capacitor 26 connected in path 21, and resistors 31 and 33 connected as shown between circuit output paths 28 and 30, and ground.

Diode 27 is connected as shown in differentiating circuit path 23 to enable the passage of negative going transitions, only, on output path 28, and diode 29 is connected as shown in differentiating circuit path 25 to enable the passage of positive going transitions, only, on output path 30. Thus, output path 28 will provide, as a scan generator output, the negative going transitions, only, of the output from differentiating circuit means 22.

Divide-by-two flip-flop means as indicated at 32 are connected in differentiating circuit means output path 30, and the former comprise an output path 34 which is capacitance coupled as shown to each of paths 36 and 38 by capacitor 42 and path 40. Integrating circuit means 44 are connected to path 36, and the former include an output path 46 for providing, as another scan generator system output, the output from the said integrating circuit means.

Staircase generator means 52 are connected to the output path 34 of divide-by-two flip-flop means 32 by paths 40, 38, 48 and 50, respectively. The staircase generator means 52 include an output path 54 on which is provided the usual, stepped waveform, and an output path 56 on which is provided an output indicative only of the recycle rate of the said staircase generator means. An output path 58 is connected to staircase generator means output path 56 to provide, as another scan generator system output, indication of the recycle rate of the staircase generator means 52. Output path 56 is also connected, through paht 60, to divide-by-two flip-flop means 62.

Phase splitter means are indicated at 64 and are connected to staircase generator means output path 54, and the former in turn include output paths 66 and 68. Single-pole double-throw switch means 70 are connected as shown to the respective output paths 66 and 68. As currently preferred, the single-pole double-throw switch means 70, and all other switch means subsequently referred to herein, will take the form of electronic switch means in the nature of generally conventional diode networks.

The output path 34 of divide-by-two flip-flop means 32 is also connected, by paths 40, 38, 48 and 74, respectively, to divide-by-two flip-flop means 72, and the latter are in turn connected, by path 76, to the single-pole double-throw switch means 70. An output path 78 extends from path 76 to provide, as another scan generator system output, the output from divide-by-two flip-flop means 72.

Phase splitter means are indicated at 84 and are connected, by paths 40, 38, 86 and 88, respectively, to the output path 34 of the divide-by-two flip-flop means 32. The phase splitter means 84 include output paths 96 and 98 which are each connected as shown to single-pole double-throw switch means as indicated at 92. The divide-by-two flip-flop means 62 are also connected to switch means 92 by path 94.

An output path 90 extends from path 86 to thus provide, as another scan generator system output, the output from divide-by-two flip-flop means 32.

Summing circuit means are indicated at 80 and are connected as shown by paths 82 and 100, to each of the single-pole double-throw switch means 70 and 92 whereby the respective outputs of the latter may be summed in the said summing circuit means. Positive clamp means (to ground) are indicated generally at 101 and are connected as shown in path 100 for purposes described in detail hereinbelow.

An output path 104 extends from the summing circuit means 80 to provide, as another scan generator means output, the output from the said summing circuit means.

Referring now in detail to the operation of the scan generator means 19 of FIG. 4, and also to the waveforms of FIG. 5, clock means 20 are operated to generate, at clock frequency, the square waveform identified as $f_c$ to the differentiating circuit means 22 to result in the provision of the waveform $df_c/dt$ on paths 23 and 25. One set of transitions (the negative going ones) of waveform $df_c/dt$ is passed by diode 27 to result in the provision, on output path 28, of the waveform 108 which functions, in the manner described in detail hereinbelow, to provide the negative or center blanking pulses which form the vertical cross hair of the display as provided by the scanning patterns of FIGS. 2 and 3.

The other set of transitions of waveform $df_c/dt$ (the positive going ones) are passed by diode 29 and therefrom, by path 30, to divide-by-two flip-flop means 32 to actuate the latter and result in the provision of the waveform $f_c/2$ on output path 34 of the said flip-flop means. This waveform $f_c/2$ is then applied, through interconnected paths 40 and 36, respectively, to the integrating circuit means 44 to result in the integration thereof and the provision, on output path 46, of the sawtooth type, line drive waveform identified as $$\int \frac{f_c}{2}$$

in FIG. 5.

Analysis of the waveform $$\int \frac{f_c}{2}$$

reveals that the slope thereof is alternately positive and negative whereby the application of this waveform to the nonillustrated horizontal deflection coils of the display tube 356 (FIG. 1) will result in alternating deflection of the scanning electron beam from right to left, and left to right, respectively, as made clear by the scanning patterns of FIGS. 2 and 3, to thus provide—in conjunction of course with the vertical drive waveform of the nature described in detail hereinbelow—for the scanning of the respective lines which make up the line pairs as illustrated in FIGS. 2 and 3, in opposite directions in even and odd frames, respectively, in the manner described hereinabove. In addition, comparison of the line drive waveform $$\int \frac{f_c}{2}$$

with the center blanking pulse waveform 108 is believed to make clear that the negative pulses of the latter coincide exactly in point of time with the respective central portion of the former to thus provide for the blanking of the scanning beam at the central portion of each line scan to maintain the former at background level and establish the vertical cross hair.

The waveform $f_c/2$ is also applied, through interconnected paths 38, 48 and 50, respectively, to the staircase generator means 52 to provide, on staircase generator means output path 54, the stepped waveform defined by the formula $$\int \frac{f_c}{2}$$

wherein Q is the number of lines per frame, which waveform is, for purposes of simplification of description, identified in FIG. 4 and referred to hereinbelow as $f_t$. If each line pair, for example line pairs EF or LM, of FIGS. 2 and 3, is considered as a unit, it may be readily understood that the vertical drive waveform, as described in detail hereinbelow, must add a step and reverse polarity with each unit. To this effect, the steps of the output waveform $f_t$ of the staircase generator means 52 may be noted to descend at the line pair rate, namely $f_c/2$.

The phase splitter means 64 are connected in the output path 54 of the staircase generator and function to provide, on the respective phase splitter means output paths 66 and 68, stepped waveforms of the nature of waveform $f_t$ of both polarities. These waveforms are applied, by the said output paths, to the dual inputs of single-pole double-throw switch means 70.

Concurrently therewith, the waveform $f_c/2$ is applied, through connected paths 38, 48 and 74, respectively, to divide-by-two flip-flop means 72 to actuate the latter and provide, on path 76, the waveform $f_c/4$, and this waveform is also introduced, as a keying signal, to the switch means 70 through the connection of the latter in path 76. Thus, the switch means 70 will function to select the staircase waveforms of alternate polarities from phase splitter means output paths 66 and 68, respectively, at half the line pair rate and provide, on switch means output path 82, the waveform equal to $$f_t \times \frac{f_c}{4}$$

and identified as $f_a$ in FIG. 5.

The waveform $f_c/2$ is also introduced, by connected paths 38, 86, and 88, respectively, to the phase splitter means 84 to provide, on phase splitter means output paths 96 and 98, square waveforms of the nature of $f_c/2$ of opposite polarities. Pulses at the frame rate are provided on staircase generator output path 56 every time the staircase generator recycles, and these pulses are applied as waveform $f_g$, by path 60, to divide-by-two flip-flop means 62 to actuate the latter and in turn provide, on path 94, the waveform $f_g/2$ of FIG. 5. This waveform $f_g/2$ functions, through the connection of path 94 to single-pole double-throw switch means 92, as a keying signal to actuate the latter at half the recycling rate of the staircase generator means 52 to provide, on switch means output path 100, the waveform defined by formula $$\frac{\left(\frac{f_c}{2} \times \frac{f_g}{2} - 1\right)}{2}$$

which is identified in FIG. 3 and hereinafter for purposes of simplicity of description as $f_b$. Positive clamp means to ground are indicated generally by 101 and are provided in the output path 100 of switch means 92 to function, in the nature of a negative bias, to lower the waveform $f_b$ one half of the step height of the staircase generator waveform $f_t$ and bring the peaks of the former into alignment with the zero axis as depicted in FIG. 5.

The waveforms $f_a$ and $f_b$ are introduced to the summing circuit means 80 by paths 100 and 82, respectively, and summed therein to result in the provision, on summing means output path 104, of the waveform $f_a + f_b$ which is applied to the nonillustrated vertical deflection coils of the display tube 356 (FIG. 1) to function as the vertical drive waveform.

Consideration of the vertical drive waveform $f_a + f_b$ of FIG. 5 makes clear that the same never passes along the zero or central line of the raster, namely, line G of FIGS. 1 and 2, whereby the said central line is never scanned by the scanning beam to result in the maintenance thereof at background level and the provision of the horizontal cross hair of the raster.

Thus, it is believed made clear whereby the separation between the lines in each pair is achieved by summing into the vertical drive, the waveform $f_a$ and the waveform $f_b$, with the polarity of the latter being reversed every other frame through the action of the phase splitter means 84 and switch means 92.

Figure 6:
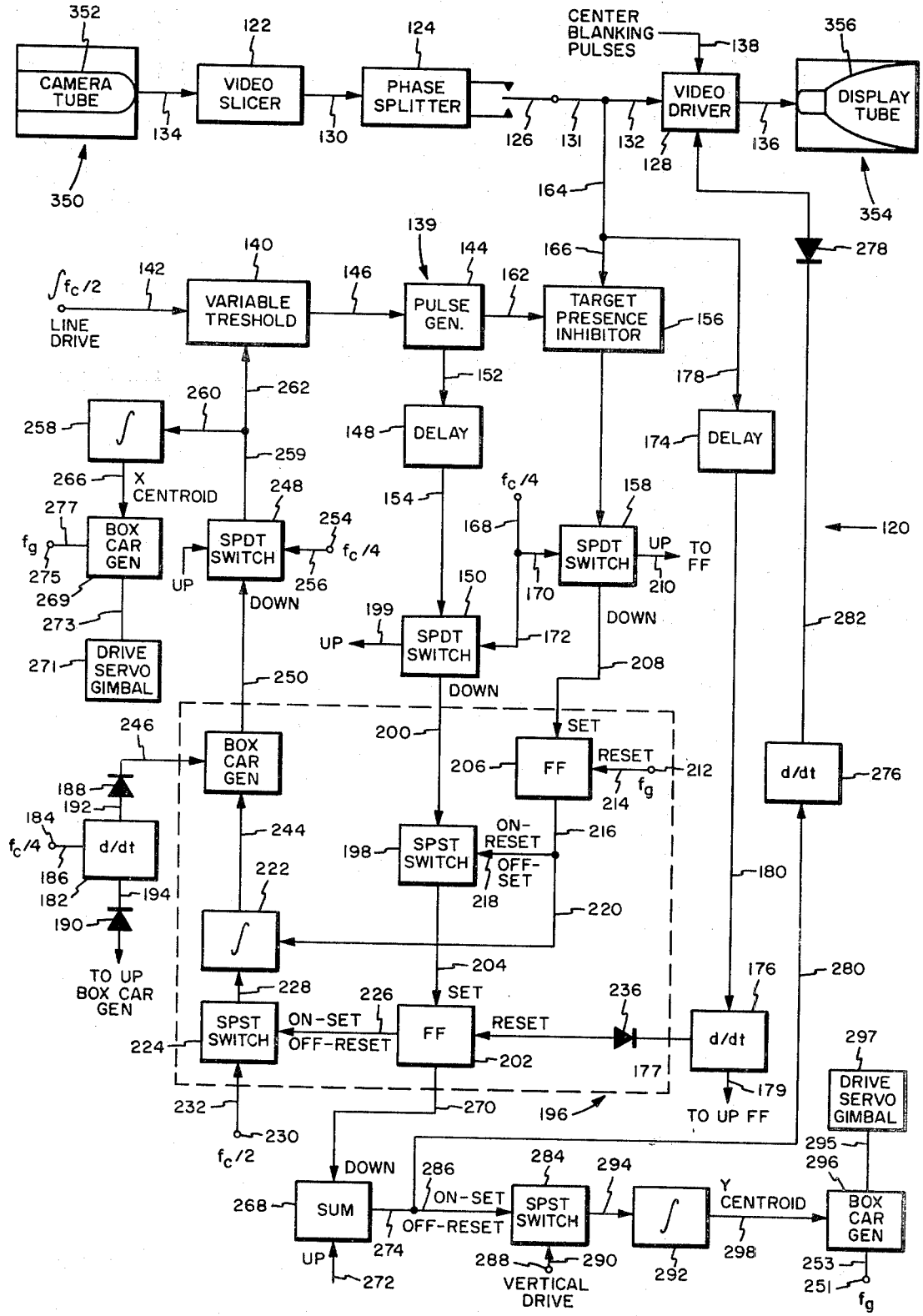
FIG. 6 illustrates, in block diagram form, the video driver means and centroid of area computer means utilized in the system of FIG. 1.

In addition to the provision of the center blanking pulse waveform 108 on output path 28, the line drive waveform $f_c/2$ on output path 46, and the vertical drive waveform $f_a + f_b$ on output path 104, the scan generator means of FIG. 4 also function to provide the waveform $f_c/2$ on output 90, the waveform $f_c/2$ on output path 78, and the waveform $f_g$ on output path 58, each for appropriate introduction to the video driver and centroid of area computer means 120 of FIG. 6 in the manner and for purposes described in detail hereinbelow.

The provision of vertical blanking pulses at the end of each line scan will probably not be essential to the provision of a satisfactory target display, due primarily to the nature of the scanning patterns of FIGS. 1 and 2 which, as dtpicted, do not require particularly extended vertical sweeps of the scanning beam. It may be noted, however, that if the provision of vertical blanking pulses proves desirable, the same may be readily accomplished in any convenient manner and may, for example, constitute the simple expedient of differentiating the waveform $f_c/2$ from path 34 and subsequently passing the negative going transitions, only, of the resultant differentiated waveform to provide the desired, negative vertical blanking pulses.

As currently preferred, the video driver means and centroid of area computer means which respectively provide the target display on display tube 356 and perform the target display centroid computations are indicated generally by 120 in FIG. 6. As depicted therein in block diagram form, the video processor system 120 comprises video slicer, phase splitter, manual contrast switch, and video driver means, 122, 124, 126 and 128, respectively, series connected as indicated by paths 130, 131 and 132. An input path 134 is provided for the application of the video signal from the camera tube 352 to the video slicer means 122; and an output path 136 is provided to connect the video driver means 128 and the display tube 356 for the application of the intensity modulated video signals to the nonillustrated, beam forming means of the latter. A center blanking pulse input path 138, which is connected to the center blanking pulse output path 28 of the scan generator means of FIG. 4, is connected to the video driver means 128 for the application of the center blanking pulse waveform 108 to the latter and the mixing thereof with the video signal prior to the transmission of the video signal to the said beam forming means along output path 136.

A centroid of area computer is indicated generally at 139 and comprises variable threshold means which may take the form of a diode network and are indicated at 140. The variable threshold means 140 include a signal input path 142 which is in turn connected to the line drive waveform output path 46 of the scan generator system means of FIG. 4 for the application of the line drive waveform $$\int \frac{f_c}{2}$$

of FIG. 5 to the said variable threshold means.

Pulse generator means are indicated at 144 and are connected to the variable threshold means 140 by path 146; and delay means 148 and single-pole double-throw switch means 150 are series connected to an output of the pulse generator means 144 by paths 152 and 154, respectively.

Target presence inhibitor means 156 and single-pole double-throw switch means 158 are connected as shown by path 160, and the target presence inhibitor means 156 are also connected, by paths 162, 164 and 166, respectively, to the pulse generator means 144 and path 131.

An input is indicated at 167 and is connected, by paths 168, 170 and 172, to the respective single-pole, double-throw switch means 150 and the single-pole, double-throw switch means 158. The input 167 is also connected to the output path 78 of the scan generator means of FIG. 6 to provide for the application of the waveform $f_c/4$ of FIG. 5 as a keying signal to the respective switch means 150 and 158.

Delay means 174 and differentiating circuit means 176 are series connected to path 164 by paths 178 and 180 to provide for the application of the video signal from path 131 to the said differentiating circuit means, and the latter include output paths 177 and 179, respectively.

Differentiating circuit means are also indicated at 182 and an input is indicated at 184. The input 184 is connected to the differentiating circuit means 182 by path 186, and the input 184 is also connected to the output path 78 of the scan generator means of FIG. 4 to enable the application of the waveform $f_c/4$ of FIG. 5 to the differentiating circuit means 182. Diodes 188 and 190 are connected as shown in the output paths 192 and 194 of the differentiating circuit means 182 and the said diodes are arranged so that diode 188 will pass only the positive going transitions of the differentiated waveform $f_c/4$, while the diode 190 will pass only the negative going transitions of the said differentiated waveform.

The centroid of area computer 139 includes both up and down channels of substantially identical configuration, with the former functioning to perform the requisite target centroid computations for the portion of the target display above the horizontal cross hair, namely, that portion which includes lines A through F, inclusive, and the latter functioning to perform the requisite computations for the portion of the target display below the horizontal cross hair, namely, that portion comprising lines H through M, inclusive. For purposes of simplification of illustration and description, only one of the said computer channels is shown, this being the down channel which is indicated generally at 196 and comprises the components enclosed within the dashed line border in FIG. 6; it being noted that all requisite connections for the nonillustrated, substantially identical up channel to the common components of the centroid of area computer 139, and the manner of operation of the said up channel, are fully described in detail hereinbelow.

Referring now in detail to the down channel 196, it comprises single-pole single-throw switch means 198 connected to single-pole double-throw switch means 150 by path 200, and flip-flop means 202 connected to the single-pole single-throw switch means 198 by path 204. Flip-flop means are also indicated at 206 and are connected to single-pole double-throw switch means 158 by path 208, and a path 210 is also provided to extend from the single-pole duoble-throw switch means 158 for connection to the nonillustrated flip-flop means in the nature of 206 which are included in the up channel of the centroid of area computer 139. An input is indicated at 212 and is connected to flip-flop means 206 by path 214. The input 212 is also connected to output path 58 of the scan generator means of FIG. 4 to enable the provision of the waveform $f_g$ of FIG. 5 to the flip-flop means 206.

The flip-flop means 206 are also connected, by paths 216 and 218, respectively, to the single-pole single-throw switch means 198, and are further connected, by path 220, to integrating circuit means as indicated at 222. Single-pole single-throw switch means are indicated at 224 and are connected to each of flip-flop means 202 and integrating circuit means 222 by paths 226 and 228, respectively.

An input is indicated at 230 and is connected, by path 232, to the single-pole single-throw switch means 224. The input 230 is also connected to the output path 90 of the scan generator means of FIG. 4 to provide for the application of the waveform $f_c/2$ of FIG. 5 to the single-pole single-throw switch means 224.

The differentiating circuit means 176 are connected to flip-flop means 202 by path 177, and a diode 236 is connected as shown in output path 177 to enable the passage to flip-flop means 202 of the negative transitions, only, from the differentiating circuit means 176. Output path 179 extends from the differentiating circuit means 176 for connection to the flip-flop means in the nature of 202 which are included in the nonillustrated up channel of the centroid of area computer 139.

An output path 270 extends from flip-flop means 202 to provide a first output for the down channel 196 of the centroid of area computer 139.

Boxcar generator circuit means are indicated at 242 and are connected as shown to each of the integrating circuit means 222 and the differentiating circuit means 182 by paths 244 and 246, respectively. An output path 250 extends from the boxcar generator circuit means 242 to provide a second output from the down channel 196 of the centroid of area computer 139.

Single-pole double-throw switch means are indicated at 248 and are connected to the boxcar generator output path 250 of the down channel 196, and to one output of the nonillustrated up channel by path 252. An input is indicated at 254 and is connected to the single-pole double-throw switch means 248 by path 256. The input 254 is also connected to output path 78 of the scan generator means of FIG. 4 to provide for the introduction of the waveform $f_c/4$ of FIG. 5 as a keying signal to the single-pole double-throw switch means 248.

Integrating circuit means are indicated at 258, and the single-pole double-throw switch means 248 are connected thereto by path 259 and 260, and the said switch means are further connected to the variable threshold circuit means by path 262. Boxcar generator means are indicated at 269 and are connected to the integrating circuit means 258 by path 266. An input is indicated at 275 and is connected to the boxcar generator means 269 by path 277. The input 275 is also connected to the output path 58 of the scan generator means of FIG. 4 to provide for the application of the waveform $f_g$ (FIG. 5) as a dump and recharge signal at the end of each frame to the boxcar generator means 269. Path 273 connects the latter with the train drive servo gimbal means 271 to provide for the train angle drive of the camera tube 352.

Sum box means are indicated at 268 and are connected to the other output of the down channel 196 as provided by path 270. The sum box means 268 are also connected, by path 272, to the other output of the nonillustrated up channel. The sum box means 268 include an output path 274, and differentiating circuit means 276 and diode 278 are series connected as shown between the said output path and the video driver means 128 by paths 280 and 282, respectively. Single-pole single-throw switch means 284 are also connected by path 286 to the output path 274.

An input is indicated at 288 and is connected to single-pole single-throw switch means 284 by path 290. The input 288 is also connected to the output path 104 of the scan generator means of FIG. 4 to provide for the introduction of the vertical drive waveform $f_a+f_b$ of FIG. 5 as a keying signal to the single-pole single-throw switch means 284.

Integrating circuit means are indicated at 292 and are connected to single-pole single-throw switch means 284 by path 294. Boxcar generator means are indicated at 296 and are connected to the integrating circuit means 292 by path 298. An input is indicated at 251 and is connected to the boxcar generator means 296 by path 253. The input is also connected to the output path 58 of the scan generator means of FIG. 4 to provide for the application of the waveform $f_g$ (FIG. 5) as a dump and recharge pulse at the end of each frame to the boxcar generator means 296. Path 295 connects the latter with the elevation drive servo gimbal means 297 to provide for the drive of the camera tube 352 in elevation angle in response to signals provided thereto by the centroid of area computer 139.

For use in the tracking of a single target as indicated at 400 in FIG. 1, the scan generator means of FIG. 4 would be operated to effect the alternate scanning of the raster in accordance with the odd frame scanning pattern of FIG. 3 and the even frame scanning pattern of FIG. 2, respectively, all in the manner described in detail hereinabove. In addition, operation of the scan generator means of FIG. 4 will, of course, result in the provision the waveform $f_g$ on output path 58, the waveform $f_c/4$ on output path 78, and the waveform $f_c/2$ on output path 90.

Figure 7:
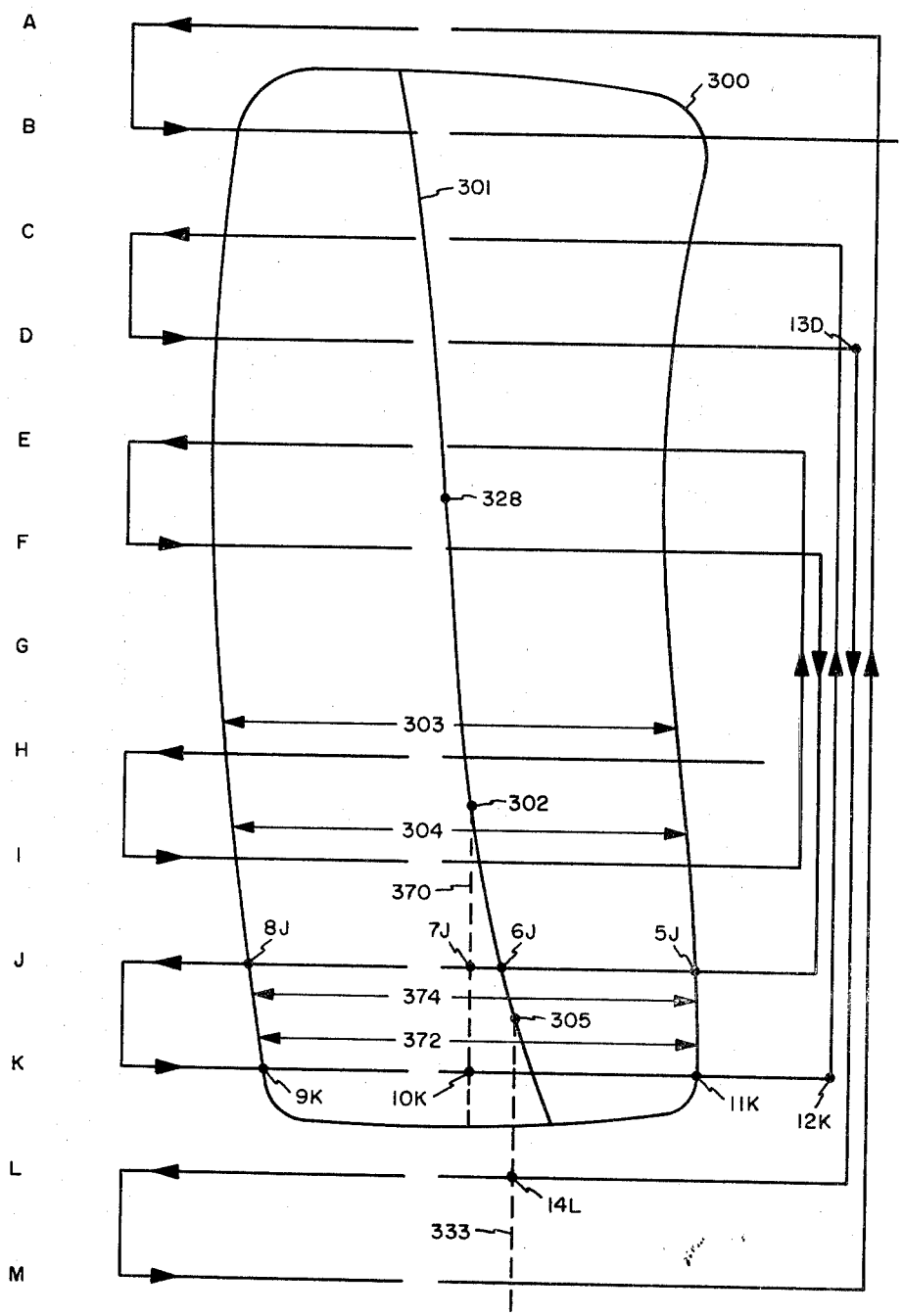
FIG. 7 illustrates the even frame scanning pattern of FIG. 2 in conjunction with the superimposition of a target display thereon.

For purposes of convenience of description and illustration, the detailed description of the operation of the video driver and centroid of area computer means of FIG. 6 will commence with the conditions thereof at the point in time during an even frame scan when the scanning beam is just beginning the right to left traverse of line K and is thus positioned as indicated at 5J in FIG. 7; and it will, for similar purposes, be assumed that point 302 on the spine 301 of the target display 300 has been determined to be the center of the line pair segments 303 and 304 generated by the scanning of the first line pair of the down channel namely, line pair HI, across the target display body. To this effect it is, of course, assumed that any bending of the target display edges and target spine 301 in the very short distance between lines H and I will be of such slight extent as to result in substantial vertical coincidence of the respective centers of the line pair segments 303 and 304. This predetermination of the line pair segments center 302 will have resulted, in the manner described in detail hereinbelow, in the establishment in the boxcar generator means 242 of the centroid of area computer down channel 196, of a threshold voltage level now being applied to the variable threshold means 140 which corresponds to the horizontal displacement of line pair segment center 302 from the center of the raster.

Thus, at this point in time, the video signal will be received at input 133, transmitted by path 134 to video slicer means 132 to enhance the contrast and sharpen the appearance of the target edges, and transmitted therefrom by path 130 through phase splitter means 124 aend manual contrast switch means 126 to enable standardization of the appearance of the target display as, for example, by appropriate adjustment to always make the target appear bright against a dark background. The video signals are then transmitted, by paths 131 and 132, to the video driver means 128 and summed in the latter with the target edge enhancement signals which are generated in the manner described in detail hereinbelow and are transmitted to the video driver means 128 by path 282, and with the center blanking pulses of the waveform 108 of FIG. 3 which form the vertical cross hair and are transmitted to the video driver means 128 by path 138. This results in the provision, on output path 136 of the video driver means 128, of the appropriate intensity modulation signal which is required for the provision of a satisfactory target display on the raster of the target display tube 356.

Concurrently therewith, the line drive waveform $$\int \frac{f_c}{2}$$

of FIG. 5 is introduced to the variable threshold means 140 by path 142 to result in the formation of the composite waveform of FIG. 8A wherein the waveform 305 illustrates the threshold voltage level, as referred to hereinabove, then being applied from boxcar generator means 242 to the variable threshold means 140 and representing the displacement, as above, of the center 302 of the segments 303 and 304 of the previously scanned, down channel, line pair HI. Analysis of the composite waveform of FIG. 8A will reveal that the line drive waveform $$\int \frac{f_c}{2}$$

passes twice through the threshold voltage waveform 305 to in effect result in the provision of a waveform 306 constituted by a relatively truncated triangle. The variable threshold means are designed to operate so that only the waveform 306 will appear at the output path 146 for transmission to the pulse generator means 144, and the waveform 306 is operated on in the said pulse generator means to produce a pulse only at the start and finish of the waveform, namely, only at each point wherein the line drive waveform $$\int \frac{f_c}{2}$$

intersects the threshold voltage level waveform 305.

For purposes of clarity of description, a variety of points of significance which coincide in point of time have been consistently identified as 5J, 6J, 7J, 8J, 9K, 10K and 11K, respectively, on lines J and K in FIG. 7 and on various of the waveforms of FIGS. 8A through 8I, inclusive. Point 7J is located on line J at the point of projection (as indicated by the dashed line 370) of the center 302 of the line pair segment 303 and 304, while point 10K is similarly located on line K.

As the scanning beam traverses line J from point 5J to point 6J no output will appear on path 146 from the variable threshold means 140 because, as made clear by FIG. 8A, the line drive waveform, $$\int \frac{f_c}{2}$$

has yet to intersect the threshold voltage level waveform 305. Traverse of the scanning beam through point 7J of line J will, however, coincide with the intersection of the line drive waveform $$\int \frac{f_c}{2}$$

with the threshold voltage waveform 305 to thus indicate that the scanning beam has traversed through the ordinate 370 of the previously determined line pair segment center 302, and will result in the generation, by pulse generator means 144, of a pulse indicative thereof on path 152. For use of the system of the invention with a frame rate of 100 per second, as discussed hereinabove, this pulse will be of very short duration in the order of .25 microsecond.

This pulse is transmitted, after a short delay provided by delay means 148, to single-pole double-throw switch means 150 which, in this instance, function in the nature of a pulse director as a result of the transmission of the waveform $f_c/4$ of FIG. 5 as a keying signal thereto from input 166 and connected paths 168 and 172, respectively. Single-pole double-throw switch means 150 are arranged to connect paths 154 and 200 when the keying signal introduced thereto along path 172 is negative, and are arranged to connect paths 154 and 199 when the keying signal introduced thereto along path 172 is positive. Thus, since at this point in time the waveform $f_c/4$ is of negative character, as made clear by comparison of FIGS. 8A and 8B, single-pole double-throw switch means 150 will function to connect path 154 to path 200 to provide for the transmission of the pulse from pulse generator means 144 to the latter of the said paths. Alternatively, if the line being scanned at this particular point were disposed above, rather than below, the horizontal cross hair of the raster, single-pole double-throw switch meanse 150 would function to transmit the said pulse from path 154 to path 199 as an input to the non-illustrated up channel as a result of the fact that the waveform $f_c/4$ would, in such instance, be positive.

The pulse from pulse generator means 144 is thus transmitted by path 200 to single-pole single-throw switch means 198 which, as utilized herein, function in the manner of a gate and are, at this point in time, "on" to enable the passage of the said pulse therethrough to path 204. The condition of single-pole single-throw switch means 198 at any point in time in the scanning process is controleld by the operation of the target presence inhibitor means 176 which receive, as one input, in the nature of a keying signal along path 166, the enhanced video signal from path 131 and, as a second input, along path 162, the pulse, if any, from pulse generator means 144.

The target presence inhibitor means 156 operate to permit the passage of the said pulse from path 162 to path 160 only in those instances wherein the video signal falls below a predetermined brightness level to thus indicate that the scanning beam is off the target display boundary, assuming, of course, that operation of the system has been arranged to provide a bright target display against a dark background. Since, at this point in time, the scanning beam is still traversing line J somewhere to the left of point 7J and is accordingly still within the target display boundary, the enhanced video signal input to the target presence inhibitor means along path 166 will be of an intensity which exceeds the said predetermined brightness level whereby the passage of the pulse from pulse generator means 144 through the target presence inhibitor means 156 to path 160 will be prevented by the former. As a result, flip-flop means 206 which had previously been reset by the pulse 324 (FIG. 5) of the waveform $f_g$ which was introduced thereto through input 212 and path 214 at the beginning of the scan of the even frame under discussion, will remain in this condition due to the absence of a pulse on path 208. Since, as indicated on FIG. 6 of the drawings, single-pole single-throw switch means 198 and flip-flop means 206 are arranged so that the former will be "on" whenever the latter are in the reset condition thereof, and vice-versa, the single-pole single-throw switch means 198 will, at this point in time, be "on." Thus the said pulse will be transmitted to path 204.

The presence of the pulse from pulse generator means 144 on path 204 will function to set flip-flop means 202 to commence the provision of a pulse as indicated at 307 in FIG. 8D, on path 226, with the leading edge of the said pulse substantially corresponding, as indicated, in point of time with intersection of the scanning beam and the projection of center 302 at point 7J on line J of the scanning pattern. Although, in actual operation, the effect of the short delay introduced by time delay means 148 will result in the said leading edge trailing slightly, in point of time, the said intersection, this factor is of no significance for "on target" scanning as made clear hereinbelow.

The pulse 307 will continue until the scanning beam passes through the target display boundary at point 8J on line J and commences to move off of the target display 300. As this occurs, the intensity of the video signal on path 131 will be materially decreased and this abrupt change in the said intensity will be transmitted, by paths 164 and 178 through delay means 174—which, as utilized herein, function solely to compensate for the delay introduced by delay means 148—and therefrom by path 180 to the differentiating circuit means 176 to result in the differentiation of the abruptly changing video signal by the said differentiating circuit means and the provision of the differentiated video signal on path 177. A diode 236 connected in path 177 permits the transmission of the negative going transitions, only, of the differentiated video signal to the flip-flop means 202, and the latter is arranged to be reset as a result thereof. This resetting of flip-flop means 202 will in turn result in the termination of the pulse 307 being transmitted from the former on path 226 and this termination will substantially correspond, as indicated by FIGS. 8A and 8D wherein the effect of time delay means 174 is not considered, with the passage of the scanning beam through the point 8J on line J and off the boundary of the target display 300. Thus it is believed made clear whereby the length or duration of the pulse 307 will correspond to the distance on line J between points 7J and 8J.

Single-pole single-throw switch means 224 are arranged so that during the intervals in which flip-flop means 202 are in the set condition and are transmitting pulses in the nature of 307 thereto along path 226, the said switch means will in turn be "on" and transmit the waveform $f_c/2$—which is being tranmitted thereto through input 230 and path 232—to path 228. Thus, the single-pole single-throw switch means 224 will, during the duration of pulse 307, transmit the corresponding portion of the waveform $f_c/2$ to path 228 and, since the said waveform portion is, at this point in time, of negative polarity as made clear by a comparison of FIGS. 8D and 8E, the negative pulse 312 of FIG. 12 will appear on path 228 for transmission to integrating circuit means 222.

In addition to the resetting of flip-flop means 202, the material decrease in the intensity of the video signal on path 164 coincident with the passage of the scanning beam off the target display boundary, will result in a change of condition in target presence inhibitor means 156 to the effect that the latter would enable the passage of pulses from path 162 to path 160. However, since at this point in time, no pulses exist on path 162 due to the fact that the waveform 305 of FIG. 8 is not now being intersected by the warevform $$\int \frac{f_c}{2},$$

no pulses will be provided on path 160 whereby flip-flop means 206 will remain reset under the effect of pulse 324 of waveform $f_g$ of FIG. 5.

The scanning beam will now complete the right to left scanning of the remaining portion of line J, be deflected vertically downward, under the action of step 362 (FIG. 8G) of the vertical drive waveform $f_a+f_b$, to line K and will commence the left to right scan of the latter. As the scanning beam passes through point 9K and thus again enters the target display 300, the intensity of the video signal on path 164 will be materially increased whereby the condition of target presence inhibitor means 156 will again be changed to prevent the passage of pulses therethrough from path 162 to path 160.

The next significant change in the operational conditions of centroid of area computer 139 will occur at the point in time when the line drive waveform $$\int \frac{f_c}{2}$$

again intersects the threshold voltage level waveform 305, and this will coincide, in point of time, with the passage of the scanning beam through point 10K on line K, it being remembered that point 10K coincides with the projection of the previously determined, line pair segment center 302. As this occurs, pulse generator means 144 will generate a second pulse as indicated at 314 in FIG. 8D which, through the setting of flip-flop means 202 in the exact manner described in detail hereinabove with regard to pulse 307, commences to appear on path 226. This pulse will also endure, in the manner of pulse 306, until such time as the scanning beam passes through point 11K of line K and thus off the boundary of the target 300 to again result in a material decrease in the intensity of video signal on path 131, the differentiation thereof, after an appropriate compensating delay by delay means 174, by differentiating circuit means 176, and attendant resetting of flip-flop means 202 to effect discontinuance of the pulse 314 as indicated at 11K in FIG. 8D. Because, at this point in time, the waveform $f_c/2$ has become positive as made clear by a comparison of FIGS. 8D and 8E, a pulse 315 forming a portion of the waveform $f_c/2$ which corresponds in duration and polarity with pulse 314 through the operation of single-pole single-throw switch means 224, will appear on path 228 following pulse 312 in the manner made clear by FIG. 8F.

Comparison of FIGS. 7 and 8F, respectively, is believed to make clear that the respective pulses 312 and 315 of the latter accurately represent the distances along lines J and K between the projection 370 of the previously determined center 302 and the respective intersections of the said lines with the target display edges. In addition, this comparison is believed to make clear that the distance 7J–8J scanned in one direction is weighted with a polarity which is opposite to the polarity with which the distance 10K–11K scanned in the other direction is weighted to thereby facilitate the utilization of the pulses 312 and 315 in the centroid of area computation process.

The waveform constituted by the pulses 312 and 315 is integrated by integrating circuit means 222, the charge and discharge rates of which are made equal to those of line drive waveform integrating circuit means 44 (FIG. 4) to thus insure that the level of the threshold voltage in the variable threshold means 140 is proper relative to the line drive waveform $$\int \frac{f_c}{2}.$$

Since, in this instance, there is a deviation between the abscissa (i.e., the distance from the vertical cross hair) of the previously computed line pair segment center 302 and the abscissa of the center 305 of the just scanned segments of line pair JK, which deviation is clearly indicated by differences in duration of the pulses 312 and 315, the voltage level of the output from integrating circuit means 222 will be changed to now be indicative of the horizontal displament from the raster center of center 305 of the line pair segments 372 and 374 of lines J and K, respectively.

At the completion of the scanning of line K by the scanning beam at point 12K, it may be noted that the waveform $f_c/4$ experiences an abrupt, positive going transition as indicated at 320 in FIG. 8B. Thus, the application of the waveform $f_c/4$ to the differentiating circuit means 182, through input 184 and path 186, at point 12K at the completion of the scanning of line K, will result in the provision, in path 192, of the differentiated waveform $f_c/4$ comprising positive pulse 321 as seen in FIG. 8H. The pulse 321 will be passed by diode 188 to path 246 and therefrom to the boxcar generator means 242 to signal the latter to dump whatever voltage has been held therein—in this instance the voltage representing the horizontal displacement as above of the previously computed line pair segment center 302—and will enable the boxcar generator means 242 to charge up to the voltage level of the output of integrating circuit means 222 which is transmitted thereto by path 244.

Differentiating circuit means 182 may also be seen to include an output path 194 in which is connected a diode 190 in such manner so as to pass the negative pulses 323 of the differentiated waveform $f_c/4$. This output path is connected, as indicated in FIG. 5, to the nonillustrated boxcar generator means of the up channel whereby it is believed made clear that, for the scanning of an even frame, the boxcar generator means 242 will be provided with a dump pulse at the completion of the scanning of each of lines I, K and M, while the nonillustrated boxcar generator means of the up channel will be similarly provided with a dump pulse at the completion of the scanning of each of lines F, D and B.

The output voltage of boxcar generator means 242 which is now the same as the output voltage of integrating circuit means 222 and is, in this instance, more positive than previously due to the fact that the duration of the positive pulse 315 (FIG. 8F) is greater than the duration of the negative pulse 312, is then applied, by path 250, to single-pole double-throw switch means 248 which, as utilized herein, function in the manner of a summing network for the respective down and up channel outputs and are keyed by the application thereto of the waveform $f_c/4$, from input 254 and path 256, to connect down channel output path 250 to path 259 when the waveform $f_c/4$ is negative, and to connect up channel output path 252 to path 259 when the waveform $f_c/4$ is positive. Since, at this point in time, waveform $f_c/4$ has passed through its zero axis and become positive, as made clear by a comparison of FIGS. 8A and 8B, passage of this voltage output from the boxcar generator means 242 to path 259 will be prevented. Thus, the said voltage will be temporarily held in the said boxcar generator means, with single-pole double-throw switch means 248 functioning now to connect paths 252 and 259 to apply the voltage held in the nonillustrated boxcar generator means of the up channel, and indicative of the horizontal displacement of the center 328 (FIG. 7) of the previously scanned line pair segments of line pair EF of the up channel from the vertical cross hair, to each of integrating circuit means 258, by path 260, and the variable threshold means 140 by path 262.

Application of this voltage to the variable threshold means 140 will result in the establishment of a new threshold voltage level 330 (FIG. 8A) therein for use as a reference level in the succeeding scanning of line pair CD and attendant target display centroid computation operation by the up channel.

This voltage from the nonillustrated boxcar generator means of the up channel which, as set forth above, is indicative of the horizontal displacement of the center 328 of the previously scanned line pair segments of line pairs EF from the vertical cross hair, is now also applied to and held in the integrating circuit means 258 which, as utilized herein, will receive a voltage—through the switching of single-pole double-throw switch means 248 in response to each change of polarity in the waveform $f_c/4$—at the completion of the on-target schanning of each line pair of both the up and down channels, each of which voltages will be indicative of the horizontal displacement, if any, from the vertical cross hair of the center of the line pair segments generated by the scanning of the immediately preceding line pair. Thus the application of each of these voltages to the integrating circuit means 258 will lag the generation thereof by the time required to scan the succeeding line pair of the other channel.

More specifically, the change in polarity 320 of the waveform $f_c/4$ which coincides in point of time with the completion of the on-target scannnig of line pair JK of the down channel, will result in the application of the voltage generated by the scanning of the preceding line pair EF of the up channel to the integrating circuit means 258, which voltage had been held in the non-illustrated boxcar generator means of the up channel for the time required to scan line pair JK of the down channel. In similar manner, the voltage generated, as described hereinabove, by the scanning of line pair JK of the down channel, will be held in the boxcar generator means 242 for the time required for the scanning of the succeeding line pair CD of the up channel, at the completion of which the change in polarity back to negative of waveform $f_c/4$, as indicated at 334 in FIG. 8B, will operate single-pole double-throw switch means 248 to apply the JK voltage from the boxcar generator means 242 to the integrating circuit means 258, by path 260, and to the variable threshold means 140 by path 262. Application of this JK voltage to the variable threshold means 140 at the completion of the scanning of line pair CD of the up channel will establish the threshold voltage level 336 (FIG. 8A) which, as set forth hereinabove, represents the displacement of center 305 (FIG. 7) of line pair JK segments 372 and 374 from the vertical cross hair and may thus be utilized as a reference for the succeeding scanning of line pair LM of the down channel.

At the completion of the scanning of each frame, both odd and even and, in this instance, of the even frame under discussion, the voltage of the integrating circuit means 258 may thus be understood to represent an error signal in the nature of the algebraic sum of all of the displacements, if any, of all of the line pair segment centers from the vertical cross hair. This voltage or error signal may accordingly be considered to represent the displacement of the X centroid of the target display 300 from the vertical cross hair.

Concurrently with the application of the pulses 307 and 314 (FIG. 8D) to single-pole single-throw switch means 224, the said pulses will, of course, be applied through path 270 to the summing means 268 and, from the latter, to the single-pole single-throw switch means 284 by connected paths 274 and 286, respectively. The single-pole single-throw switch means 284 are arranged to be "on" when the flip-flop means 202 are set, and to be "off" when the said flip-flop means are reset. Thus at this point in time, the single-pole single-throw switch means 284 will be "on." As a result, the application thereto from input 288 and path 290 of the vertical drive waveform $f_a+f_b$ of FIG. 5, will function to in effect modulate the pulses 307 and 312 in accordance with the characteristics, at this point in time, of the said vertical drive waveform, to provide, on path 294, a voltage which represents the summation of the lengths of the respective segments of lines J and K which intersect the target as algebraically weighted in accordance with magnitude of the respective displacements thereof from the horizontal cross hair.

This is believed made clear by analysis and comparison of the respective configurations of the pulses 307 and 314 of FIG. 8D and the relevant portion of the vertical drive waveform $f_a+f_b$ of FIG. 8G. If, for the purposes to the single-pole singl-throw switch means 284 by conof description, the duration of pulse 307 is assigned a value of one unit, the duration of pulse 314 assigned a value of 1.25 units, the extent of the displacement of step 327 of waveform $f_a+f_b$ from the zero axis assigned a value of $-3$ units, and the displacement of step 331 of waveform $f_a+f_b$ from the zero axis assigned a value of $-4$ units, it may be clearly illustrated that the overall value of the voltage on path 294 will represent the sum of the products of the said pulses and waveform steps which are coincident in time. Thus, in this instance, the value of the said voltage would be equal to $$+1 \times -3 + 1.25 \times -4$$

or $-8$ units and this value represents the weighted, vertical displacement of the center 305 from the horizontal cross hair.

Application of this voltage, by path 294, to the integrating circuit means 292 will result in the integration thereof whereby the voltage of the integrating circuit means 292 will, at the completion of the scanning of each frame, represent an error signal in the nature of the algebraic sum of all of the displacements, if any, of all of the line pair segment centers from the horizontal cross hair. This voltage or error signal may accordingly be considered to represent the displacement of the Y centroid of the target display 300 from the horizontal cross hair.

At the completion of the scanning of the even frame under discussion, the pulse 325 (FIG. 5) of the waveform $f_g$ will be simultaneously applied, through inputs 275 and 251 and paths 277 and 253, to the respective boxcar generator means 269 and 297 and will, in each instance, function as a dump pulse to signal the said boxcar generator means to dump whatever voltages are then held therein and charge up to the level of the voltages now being applied on paths 266 and 298, respectively. Thus, boxcar generator means 269 will dump the voltage representing the horizontal displacement of the X centroid of the target display 300 from the vertical cross hair, as determined by the scanning of the preceding odd frame, and will charge up to the voltage representing the horizontal displacement of the X centroid of the target display 300 as determined by the scanning of the even frame under discussion; while boxcar generator means 296 will dump the voltage representing the vertical displacement of the Y centroid of target display 300 from the horizontal cross hair, as determined by the scanning of the preceding odd frame, and will charge up to the voltage representing the vertical displacement of Y centroid of the target display 300 from the horizontal cross hair, as determined by the scanning of the even frame under discussion.

These X and Y centroid displacement voltages will thus be sampled and held by the said boxcar generator means and simultaneously applied as error signals, by paths 273 and 295, respectively, to the respective horizontal drive servo gimbal means 271 and vertical drive servo gimbal means 297 for the duration of the scanning of the succeeding odd frame. As a result, the said servo gimbal means will function to drive the camera tube 352 to substantially center the target 400 within the field of view thereof, and thus align the X centroid of the target display 300 with the vertical cross hair, and the Y centroid of the target display 300 with the horizontal cross hair. As a result, the desired substantial coincidence between the centroid of area of the target display 300 and the center of the raster will be achieved.

In actual practice with a frame rate of 100 per second as proposed hereinabove, operation constituting actual driven movement of the camera tube 352 by the respective servo gimbal means 271 and 297 in response to the pair of X and Y centroid displacement signals applied thereto at the completion of each frame scan, would probably not occur, in that 100 discrete movements per second would most probably exceed the mechanical response capabilities of the camera tube drive system. As a result the respective servo gimbal means 271 and 297 would probably each function to average the centroid displacement signals applied thereto and respond primarily to the low frequency components thereof to provide a camera tube drive rate which would prove more than satisfactory in establishing and maintaining substantial target display centroid and raster center coincidence.

The pulses 307 and 314 are also applied from sum box means 268, by path 280, to differentiating circuit means 276 to provide the differentiated waveform of FIG. 8J on path 282. A diode 278 is connected as shown in path 282 so as to pass only the negative going transitions 329 of the said differentiated waveform for introduction to the video driver means 128 at an inverting point in the operation of the latter. Thus the said transitions will be summed with the video signal to enhance the brightness of the target display edges and make clear to the camera operator that he is on the right target. That these target edge enhancement pulses will occur, in the scanning of lines J and K, only when the scanning beam leaves the target boundary in passing through points 8J and 11K, respectively, is believed made clear by a comparison of the differentiated waveform of FIG. 8J and the pulses 307 and 314 of FIG. 8D.

The completion of the scanning of line pair JK by the scanning beam will be followed by the vertically upward deflection of the latter, the scanning thereof of the line pair CD with attendant centroid area computation in the nonillustrated up channel, and the subsequent vertically downward deflection of the scanning beam to the right hand extremity of line L to commence the scanning of line pair LM. Thus, as the scanning beam passes through the point of projection of center 305, as indicated by the intersection of line L and the dashed line 333 (FIG. 7), in its right to left traverse of line L, a pulse will be generated by pulse generator means 144 as a result of the intersection at point 14L of the line drive waveform $$\int \frac{f_c}{2}$$

with the threshold voltage waveform 336 then existing in variable threshold means 140 and representing the horizontal displacement of the said center from the vertical cross hair.

This pulse, which will occur at point 144 as seen in FIG. 8A, will be simultaneously applied, by paths 162 and 152, respectively, to the target presence inhibitor means 156 and the short delay means 158. Since, at this point in time, the scanning beam has passed beneath the lower extremity of the target boundary, with resultant maintenance of the intensity of the video signal at the background level, the said pulse will be passed by the target presence inhibitor means to the single-pole double-throw switch means 158. As a result of the condition of the said switch means which are, at this point in time, keyed to connect paths 160 and 208 by the negative polarity, as seen at 335 in FIG. 8B, of the waveform $f_c/4$ which is applied thereto by input 166 and paths 168 and 170, respectively, the said pulse will be applied, by path 208, to the flip-flop means 206 of the down channel 196.

The application of this pulse to the flip-flop means 206 will result in the setting thereof and the attendant turning off of single-pole single-throw switch means 198, through connected paths 216 and 218, respectively, and the clamping of the output of integrating circuit means 222 to zero through connected paths 216 and 220. Thus, the passage of the said pulse—which had been delayed for an appropriate period of time by delay means 148—from path 152 through the single-pole single-throw switch means 198 to the flip-flop means 202 will be prevented, and further computation by the down channel of the respective target centroid displacements effectively locked out for the remainder of the down channel scanning during the even frame under discussion. This is to say that it will not be until the target display 300 is again intersected by the scanning beam during down channel scanning—as will not occur in this instance until the scanning of line I during the scanning of the succeeding odd frame—to raise the intensity of the video signal above the predetermined level and again condition target presence inhibitor means 156 to prevent the passage of pulses therethrough and enable flip-flop means to remain reset under the effect of the pulses of waveform $f_g$ which are introduced thereto at the beginning of each frame—that the passage of pulses from pulse generator means 144 through single-pole single-throw switch means 198 to flip-flop means 202 will again be permitted. Thus, further target centroid displacement computation by the down channel is automatically terminated once a scan line—here scan line L passes below the target display boundary, assuming, of course, that the said boundary is disposed below the horizontal cross hair.

The clamping of the output of integrating circuit means 222 to zero will function, after appropriate switching of the single-pole double-throw switch means 248 by the negative polarity of waveform $f_c/4$ to connect paths 250 and 259 as described in detail hereinabove, to bring the level of the voltage in variable threshold means 140 to zero, which is the level thereof which corresponds to the vertical cross hair. Thus, the on-target display scanning of lines I and H during the succeeding odd frame scan will, of necessity, result in the generation of a pulse by the pulse generator means 144 at each point on lines H and I where the scanning beam passes through the vertical cross hair, which points will, of course, correspond in point of time with the intersections of the line drive waveform $$\int \frac{f_c}{4}$$

with the 0 level threshold voltage. As a result, it will not be until the completion of the scanning of line pairs IH and FE of this odd frame and the commencement of the scanning of line K of the said odd frame, that a voltage level indicative of the actual horizontal displacement, if any, of a line pair segment center—in this instance the center of the line pair segments generated by the scanning of line pair IH—will be established in the variable threshold means 140 for use, as above, in the down channel, target centroid computation process.

If it is borne in mind, however, that the centroid of area computer 139 functioned, at the completion of the scanning of the even frame formerly under discussion, to tend to drive the X centroid of the target display 300 into substantial coincidence with the vertical cross hair, it should become clear that, under normal circumstances, there should be very little, if any, displacement therebetween at the commencement of the scanning of the said succeeding odd frame, and this would be especially so for use with a frame rate of 100 per second.

Certain unusual configurations and/or target surface characteristics, can lead to some difficulty in the operation of the target centroid tracking system of the invention. Thus, for example, a dark inclusion on a bright target could function to effectively shadow legitimate target areas further removed from the spine of the target by giving rise to an erroneous indication that the scanning beam had passed off the target as indicated by the material decrease in the intensity of the former as it scans the said dark inclusion. In addition, instances wherein the slope of the target display edge is horizontal, but the target display edge itself is concave outward may also lead to errors in the computation process, with the precise effect, in this instance, depending upon the position of the target spine. In each of these instances, however, the utility of the centroid of area computation will be retained so long as the indicated centroid of area of the target display remains within the boundaries of the latter, and it is expected that this will be true for the great majority of target configurations.

If desired, means for the performance of several additional useful functions can readily be incorporated into the target tracking system of the invention as described thus far. Thus, for example, if the camera tube means 352 (FIG. 1) are equipped with a zoom lens, means could be provided which would function to maintain the size of the target display substantially constant on the display tube means and, in any event, smaller in all dimensions than the scanned area of the raster. This would require the provision of additional integrating circuit means to repeatedly integrate the output of the summing circuit means 268 (FIG. 6) at the end of each frame through the resetting of the output of the additionally provided integrating circuit means to zero at the beginning of each frame, to thus yield the size of the target display on a sample basis. Thus, comparison of the size of the target display as indicated by the output of the additionally provided integrating circuit means at the end of any two successive frames, through the use of nonillustrated boxcar circuit means to hold the previous frame information, would yield the rate at which the size of the target display is changing. This target display size rate signal could then be utilized to control the said zoom lens, thereby creating a closed loop which, through proper arrangement of the sense of the feedback, would tend to drive the target display size rate signal to zero and thus maintain the target display size substantially constant on the raster of the display tube 356. Means of this nature would probably prove most useful for homing operation, as described hereinbelow, against fixed targets.

If the respective X and Y centroid displacement outputs on paths 295 and 273, respectively (FIG. 6), are considered as guidance error signals, the inclusion of means as above to maintain the size of the target display substantially constant would also function to maintain substantially constant sensitivity with respect to linear displacements of the line of sight on the target over the practical range of the zoom lens. Alternatively, if fixed focal length lens means are utilized in conjunction with the camera tube means 352, the target display size information will provide an inverse measure of range to impact.

For applications wherein operation against moving targets is required, as discussed hereinbelow, the indicated rate of change of target display size may be utilized to prevent capture of the single target centroid tracking system of the invention by interfering objects to thus maintain the former locked on to the single target of interest. In this instance, the logic would be that, during homing guidance, the size of the target display on the camera tube means raster should continually increase since the camera tube means should be continually approaching the target. Thus, if the size rate of the target display turns negative, this can be taken as indicative of the fact that an interfering object is passing the field of view of the camera tube means. To prevent capture of the tracking system of the invention by this interfering object, the negative target display size rate signal could be utilized to switch the inputs of the respective integrating circuit means 292 and 258 from the single-pole single-throw switch means 284 and the single-pole double-throw switch means 248, respectively, to remembered rate inputs which could be provided thereto from nonillustrated remembered rate input means. Preferably, these remembered rate inputs would be equal to the averaged (smoothed) values of the outputs of the said respective switch means over a number of the preceding frames. Thus, operation would continue utilizing the said remembered rate inputs, rather than the inputs from the said switch means which might, at this point in time, be indicative of the centroid displacements of the interfering object rather than of the target of interest, until such time as the indicated target display size rate became positive once again to in turn indicate that the interfering object had passed from the field of view of the camera tube means and that the latter were once again transmitting video signals indicative of the configuration of the target of interest. Thus, so long as the target of interest has not passed from the field of view of the camera tube means 352 in the time required for the interfering object to pass through the said field of view, reacquisition of the target of interest by the system of the invention and appropriate homing guidance course correction by the latter to compensate for changes in position achieved by the target of interest during the passage of the interfering object through the field of view, should be accomplishable without significant difficulty by the system of the invention, and especially at an operational frame rate of 100 or more per second.

A wide variety of utilizations and/or arrangements of the single target centroid tracking system of the invention are contemplated. Thus, for example, if the entire system of FIG. 1 is to be disposed on the same carrier means as, for example, an aircraft, a truck, a space vehicle, or a ground-supported mounting platform, the path 134 would preferably be constituted by coaxial cable in the nature of that commonly used for the transmission of video signals, and the paths 273 and 295 constituted by conventional, signal transmitting conductor means. Such utilizations of the target centroid tracking system of the invention might function, for example, to maintain a device in the nature of film camera means trained on the centroid of the target of interest and, in this instance, the said film camera means would be cooperatively associated with the camera tube means 352 or the respective servo gimbal means 271 and 297 so as to follow the movement of the said camera tube means.

Alternatively, the video signal transmitting means 350 including the camera tube means 352, and the respective servo gimbal means 271 and 297 may be disposed on one carrier means, and the remainder of the system as depicted in FIG. 1 disposed on another and separate carrier means in which instance, and especially if significant movement is possible between the said one and separate carrier means, the respective paths 134, 295 and 273 would be constituted by beams of RF wave radiation rather than by physical conductor means. If, in such instance, the one carrier means were movable relative to the target and the separate carrier means, and included movement guidance means for directing the movement of the said one carrier means toward the target and providing for carrer means-target collision, or close proximity therebetween, the said movement guidance means would, of course, be cooperatively associated with the servo gimbal means or camera tube means to follow the movements of the latter and thus maintain the said one carrier means on a collision or close proximity course with the target.

Although a specific embodiment of the invention has been described in considerable detail for illustration purposes, many modifications can be made within the spirit of the invention. It is, therefore, desired that the protection afforded by Letter Patent be limited only by the true scope of the appended claims.

What is claimed is:

1. In a single target centroid tracking system which includes video signal transmitting means comprising adjustable positionable camera means which are positionable so that the target is within the field of view thereof to provide video signals indicative of the target configuration, and video signal receiving means including display tube means for providing a display of said target configuration said display tube means having a generally central portion, the improvement comprising, scanning means to operate said video signal receiving means in response to said video signals to provide a display of said target configuration on said display means, means to compute the displacement, if any, of the centroid of area of said target configuration display from said generally central portion and to generate error signals representative of said displacement, said scanning means comprising scan generator means for generating a plurality of operating waveforms to effect the line scanning of the raster of the display tube and the operation of said computing means, respectively, means operative in response to said error signals to adjust the position of said camera means so that said target is substantially centered within the field of view of said camera means and the centroid of area of said target configuration display is driven into said central portion of said display means, and said computing means further comprising means to partially discontinue the operation thereof when a line being scanned fails to intersect the target configuration display boundary, said discontinuance means being effective until the commencement of the scanning of the next frame and only for that portion of the target configuration display disposed to the same side of said central position as the line being scanned.

2. In a single target centroid tracking system as in claim 1 wherein, said computing means further comprise means to enhance some portions, at least, of the target configuration display boundary.

3. In a single target centroid tracking system which includes video signal transmitting means comprising adjustably positionable camera means which are positionable so that the target is within the field of view thereof to provide video signals indicative of the target configuration, and video signals receiving means including a display tube means for providing a display of said target configuration, said display tube means having a generally central portion, the improvements comprising, scanning means to operate said video signal receiving means in response to said video signals to provide a display of said target configuration on said display means, means to compute the displacement, if any, of the centroid of area of said target configuration display from said generally central portion and to generate error signals representative of said displacement, said scanning means comprising scan generator means for generating a plurality of operating waveforms for operating said computer means, and to effect the scanning of the raster of said display tube in accordance with a scanning pattern wherein the central line of said raster is not scanned to provide first line indicia of said central portion, and the remainder of said raster is scanned by line pairs which are disposed respectively to opposite sides of said central line and are alternately scanned to opposite sides of said central line, said scan generator means further comprising means to generate a center blanking pulse waveform to blank out the central part of each of the lines of each of said line pairs to provide second line indicia of said central portion, said computing means comprising means to compute the displacement, if any, from said first line indicia, of the center of each of the segments of said target configuration display generated by the scanning of said line pairs, means to compute the displacement, if any, from said second line indicia, of the center of each of the segments of said target configuration display generator by the scanning of said line pairs, means to provide first and second outputs which are respectively representative of each of said displacements, said computing means further comprising means to sum each of said outputs to provide first and second output summations which are, respectively, representative of the displacements of said target configuration display centroid from said first and second line indicia, said computing means further comprising means to sample and hold said first and second output summations and provide the same as said error signal substantially at the completion of the scanning of each frame, said computing means further comprising means to partially discontinue the operation thereof when a line being scanned does not intersect the target configuration display boundary, said discontinuance means being effective until the commencement of the scanning of the next frame, and only for that portion of the target configuration display disposed to the same side of said first line indicia of said line being scanned, and, means operative in response to said error signals to adjust the position of said camera means so that said target is substantially centered within the field of view of said camera means and the centroid of area of said target configuration display is driven into said central position of said display means.

4. In a single target centroid tracking system as in claim 3 further comprising, means for enhancing some portions, at least, of the boundary of said target configuration display.

5. In a single target centroid tracking system which includes video signal transmitting means comprising adjustably positionable camera means which are positionable so that the target is within the field of view thereof to provide video signals indicative of the target configuration, and video signal receiving means including display tube means for providing a display of said target configuration, said display tube means having a generally central portion, the improvements comprising, scanning means to operate said video signal receiving means in response to said video signals to provide a display of said target configuration on said display means, means to compute the displacement, if any, of the centroid of area of said target configuration display from said generally central portion and to generate error signals representative of said displacement, said scanning means comprising scan generator means for generating a plurality of operating waveforms for operating said computer means, and to effect the scanning of the raster of said display tube in accordance with a scanning pattern wherein the central line of said raster is not scanned to provide first line indicia of said central portion and the remainder of said raster is scanned by line pairs which are disposed respectively to opposite sides of said central line and are alternately scanned to opposite sides of said central line, said scan generator means further comprising means to generate a center blanking pulse waveform to blank out the central part of each of the lines of each of said line pairs to provide second line indicia of said central portion, said computing means comprising first and second channels, with said first channels comprising means to compute the respective displacement, if any, from the raster center of the centers of the target configuration display segments generated by the scanning of line pairs disposed to one side of said first line indicia, said second channel comprising means to compute the respective displacements, if any, from the raster of the center of the target configuration display segments generated by the scanning of line pairs disposed to the other side of said first line indicia, each of said computing channel means comprising means to generate a first voltage which is representative of the displacement, if any, from said second line indicia of the center of each of the segments of said target configuration display generated by the scanning of the line pairs of the corresponding channel means, the respective lines of each line pair being scanned in opposite directions during the scanning of any given frame, said voltage generating means comprising means operation during the scanning of each line pair which intersects the target boundary for generating a first pulse which is proportional in duration to the distance on the first scanned line of a line pair between the projection of the center of the target configuration display segment generated by the scanning of an adjacent, previously scanned line pair disposed to the same side of said first line indicia and the target boundary, means to generate a second pulse which is proportional in duration to the distance on the second scanned line of said line pair between said center projection and the target boundary, means for reversing the polarity of one of said pulses, means for combining said pulses in accordance with the respective durations and polarities thereof to provide said first displacement representative voltage, and means operative in response to said error signals to adjust the position of said camera means so that said target is substantially centered within the field of view of said camera means and the centroid of area of said target configuration display is driven into said central portion of said display means.

6. In a single target centroid tracking system as in claim 5 wherein, said computing means further comprise means to multiply each of said pulses by a voltage which is proportional to the respective displacements of said first and second scanned lines from said first line indicia to provide a second voltage which is representative of the displacement of the target configuration display segment center from said first line indicia.

7. In a single target centroid tracking system as in claim 6 wherein, said computing means further comprise means to sum said first and second voltages during the scanning of each frame to provide, at the completion of the scanning of each frame, first and second output voltages which are respectively representative of the displacement of the centroid of said target configuration display from each of said second and first line indicia.

8. In a single target centroid tracking system as in claim 7 further comprising, means to sample and hold each of said first and second output voltages and provide the same as said error signals substantially at the completion of the scanning of each frame.

9. In a single target centroid tracking system as in claim 7 wherein, each of said computing means channel means further comprise means to discontinue the operation thereof when a line being scanned does not intersect the target configuration display boundary, said discontinuance means being effective until the scanning of the next frame.

10. In a single target centroid tracking system as in claim 9 wherein, said computing means further comprise means to enhance some portions, at least, of the target configuration display boundary.

11. In a single target centroid tracking system as in claim 9 wherein, said means for discontinuing operation of each of said computer means channel means comprise target presence inhibitor means which are operative in response to the intensity of said video signals to prevent the passage of said pulses to said voltage summing means.

References Cited

UNITED STATES PATENTS

| | | | |
|---|---|---|---|
| 2,774,964 | 12/1956 | Baker et al. | 178—6.8 |
| 3,010,024 | 11/1961 | Barnett et al. | 178—6.8 |
| 3,043,907 | 7/1962 | Martin | 178—6.8 |
| 3,046,332 | 7/1962 | Engler | 178—6.8 |
| 3,257,505 | 6/1966 | Van Wechel | 178—6.8 |

ROBERT L. GRIFFIN, Primary Examiner

B. L. LEIBOWITZ, Assistant Examiner

U.S. Cl. X.R.

343—6